United States Patent [19]
Reed et al.

[11] Patent Number: 5,143,472
[45] Date of Patent: Sep. 1, 1992

[54] ANCHOR BRACKET ASSEMBLY

[76] Inventors: Robert H. Reed, 25557 Snyder Ave., Conifer, Colo. 80433; Robert B. Reed, 26209 Wildflower Trail, Evergreen, Colo. 80439

[21] Appl. No.: 537,347
[22] Filed: Jun. 13, 1990
[51] Int. Cl.⁵ .............................................. F16B 7/08
[52] U.S. Cl. ..................................... 403/230; 403/403; 52/298; 256/59
[58] Field of Search ............... 403/382, 403, 198, 199, 403/262, 232.1, 230, 189, 205; 256/69, 65, 59; 52/242, 292, 298, 288, 296, 297

[56] References Cited

U.S. PATENT DOCUMENTS

| | | | |
|---|---|---|---|
| 1,999,741 | 4/1935 | Schultz | 52/242 |
| 2,666,238 | 1/1954 | Hagedorn | 403/230 X |
| 2,863,352 | 12/1958 | Mikesic | 403/403 X |
| 2,911,022 | 11/1959 | Brown | 403/230 X |
| 3,466,071 | 9/1969 | Reed | 403/230 X |
| 4,032,242 | 6/1977 | Morris | 403/403 X |
| 4,330,971 | 5/1982 | Auberger | 403/232.1 X |
| 4,367,864 | 1/1983 | Eldeen | 403/262 X |
| 4,381,160 | 4/1983 | Grimm et al. | 403/230 |
| 4,835,935 | 6/1989 | Murphy | 403/403 X |
| 4,948,204 | 8/1990 | Kilmartin, III | 403/382 X |

FOREIGN PATENT DOCUMENTS

| | | | |
|---|---|---|---|
| 622575 | 11/1935 | Fed. Rep. of Germany | 403/230 |
| 2056647 | 5/1972 | Fed. Rep. of Germany | 52/288 |
| 2744523 | 6/1978 | Fed. Rep. of Germany | 403/232.1 |
| 999829 | 7/1965 | United Kingdom | 52/288 |

Primary Examiner—Peter M. Cuomo
Attorney, Agent, or Firm—John E. Reilly

[57] ABSTRACT

An anchor bracket assembly for securing support posts to a floor surface and particularly useful for handrail assemblies, there being a plurality of anchor brackets affixed to the base of each post and having angular flanges extending away from the post with fasteners pigtailed through the angular flanges into the floor, and molding or cover strips positioned over the anchor brackets.

8 Claims, 1 Drawing Sheet

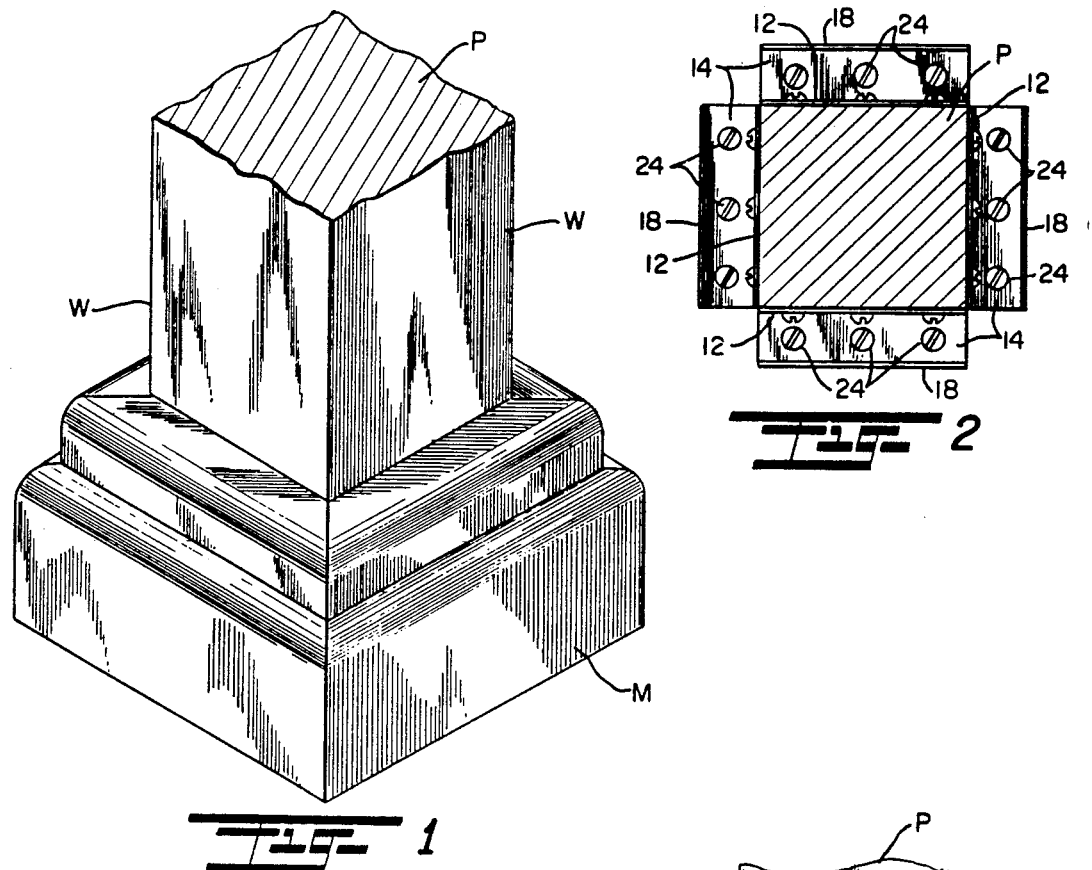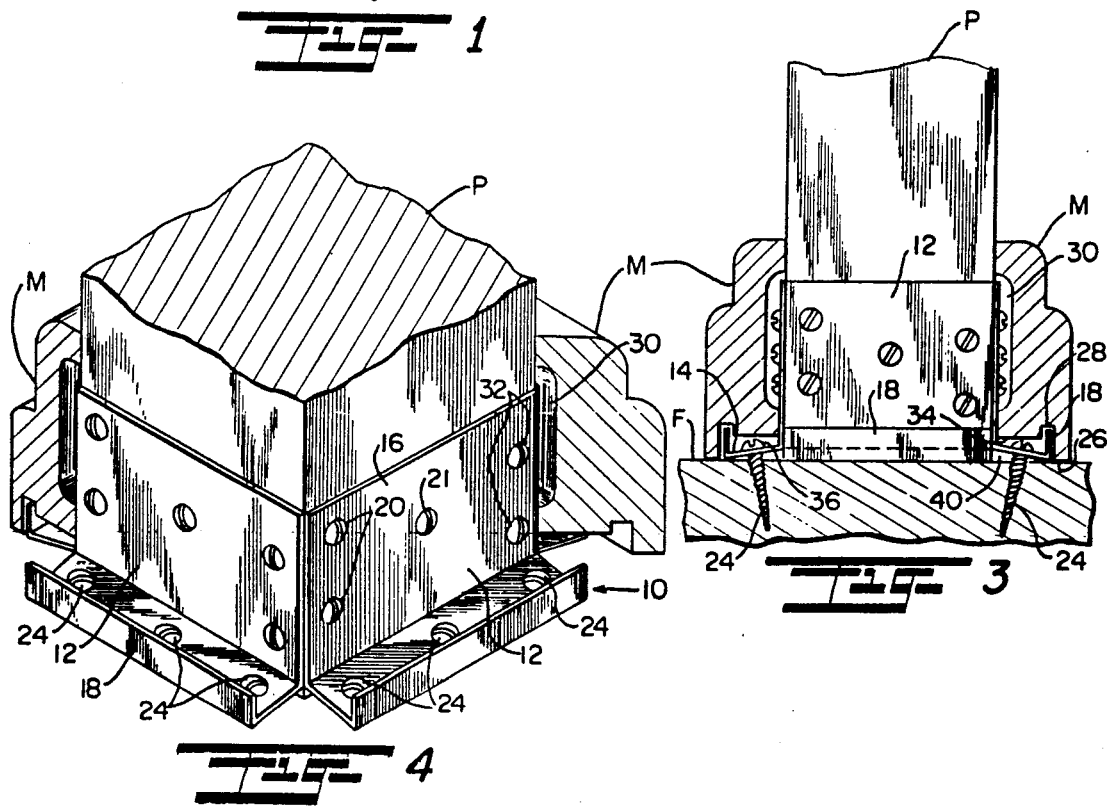

ANCHOR BRACKET ASSEMBLY

This invention relates to attaching devices for securing a first support member in a selected position relative to a second support member; and more particularly relates to a novel and improved anchor bracket for supporting a newel in upstanding relation to a floor surface.

BACKGROUND AND FIELD OF THE INVENTION

Numerous types of attaching devices have been devised for securing support posts or other upstanding members in a selected position relative to a floor surface. Particularly in the case of handrail assemblies, the support posts or newels must be firmly anchored into the floor to withstand lateral forces which are imparted when a person leans on the handrail or grasps the handrail in ascending or descending a stairway. Attempts have been made to firmly anchor the newel by pigtailing directly through the newel into the floor. Also, corner brackets have been devised in which oppositely directed flanges at the lower end of the bracket alternately extend away from the lower edge of the bracket and are attached directly into the floor surface and, for example, reference is made to U.S. Letters Pat. No. 4,381,160 to Grimm et al. Brackets of this type are primarily intended for use in the original installation of the newels since the brackets must first be anchored in place to the floor surface and then attached to the base or lower end of the newel. However, it is desirable to provide for an anchor bracket assembly which is conformable for use either in the original installation of a newel or can be utilized to reinforce or repair existing newels and in such a way that any decorative trim or molding sections may be repositioned or placed over the bracket assembly once in position.

SUMMARY OF THE INVENTION

It is therefore an object of the present invention to provide for a novel and improved anchor bracket assembly which is dependable and cost efficient.

Another object of the present invention is to provide for a novel and improved post support assembly for anchoring the base of a post to a floor surface in a highly effective and dependable manner.

It is a further object of the present invention to provide for a novel and improved anchor bracket conformable for use in securing a first support element in a selected position relative to another angularly disposed element and is particularly adaptable for use in a handrail assembly for fastening the lower ends of the newels of the handrail assembly to the floor surface.

An additional object of the present invention is to provide for a novel and improved anchor bracket which is specifically adaptable for use in positioning a post or newel in fixed relation to a floor surface and at the same time facilitate attachment of decorative molding around the base of the post or newel.

In accordance with the present invention, an anchor bracket assembly has been devised for securing a newel in upstanding relation to a floor surface and which assembly comprises a plurality of bracket members each including an angularly extending flange portion extending downwardly and away from the newel, an upper attaching portion and a lower edge of the angularly extending flange portion resting on the floor surface, and first securing means for securing the attaching portion to the newel and second securing means for securing the angular flange portion to the floor surface. Preferably, the lower edge of each flange has an upwardly projecting lip to support decorative trim or molding around the base of the newel, and the angular flange extends away from the newel at an acute angle to the floor surface, and the second securing means preferably takes the form of wood screws which are pigtailed downwardly through the angular flange into the floor surface beneath the newel or post.

The above and other objects, advantages and features of the present invention will become more readily understood and appreciated from a consideration of the following detailed description of a preferred embodiment of the present invention when taken together with the accompanying drawings in which:

BRIEF DESCRIPTION OF THE DRAWINGS

FIG. 1 is a perspective somewhat fragmentary view of the base of a newel used in a typical handrail assembly;

FIG. 2 is a cross-sectional view through the base of the newel shown in FIG. 1 with the exterior molding removed;

FIG. 3 is a front view partially in section of the base of a newel and illustrating in more detail the attachment of anchor brackets between the base of the newel and a floor surface; and FIG. 4 is another perspective view similar to FIG. 1 illustrating the base of a newel but with portions of the molding removed to illustrate the mounting of anchor brackets thereon.

DETAILED DESCRIPTION OF THE PREFERRED EMBODIMENT

Referring in more detail to the drawings, there is illustrated in FIGS. 1 to 4 a preferred form of newel support assembly 10 which comprises a plurality of anchor brackets 12 and a first and second series of fastener elements 13 and 24, respectively. Each anchor bracket is secured in a manner to be described to one wall surface W at the lower end or base of the post or newel designated at P. Although the newel is illustrated as being of generally rectangular cross-section, it will be apparent that in accordance with conventional practice it may assume various cross-sectional configurations, and the anchor bracket 12 of the present invention may be configured to conform to the particular curvature or surface configuration of the sidewall(s) of the post or newel P. As further illustrated in FIG. 3, the anchor brackets 12 are specifically intended for use in anchoring the post or newel P to a perpendicular surface, such as, the floor surface designated at F so that the post is anchored in upstanding relation. In this relation, the post is specifically intended for use as a newel in a handrail assembly, such as, for example, of the type installed along a stairway in which newels or posts are arranged at spaced intervals to support the upper horizontal rail portion of the handrail assembly. In a typical installation, the newels P are constructed of wood as illustrated in the drawings but can be fabricated out of other materials.

For purposes of describing the present invention, again the posts or newels P are typically constructed of wood. Each anchor bracket 12 is made up of an angular flange 14 having an upper attaching portion 16 and an outer lip portion 18. First securing means are defined by fasteners in the form of wood screws 20 which extend through apertures 21 in the upper attaching portion and driven into the base of the post to permanently affix the upper attaching portion 16 thereto. Second securing means are similarly defined by fasteners in the form of wood screws 24 at spaced intervals across the angular flange 14 and which are pigtailed or angled downwardly and somewhat inwardly into the floor surface F, as best seen from FIG. 3.

The outer lip 18 projects upwardly a limited distance from the lower edge 26 of the angular flange 14 to serve as a means of positioning and alignment of molding strips M. As shown, each of the molding strips M is provided with a groove 28 in its undersurface which is aligned for insertion of a lip 18 therein with lower edge of the molding strip M resting on the floor surface. Also, the molding strip M is given a slight recessed area 30 to accommodate the slotted or enlarged ends 32 of the fasteners 20 on the vertical flange. The bottom surface of the molding strip is undercut as at 34 to afford ample clearance for the angular flange 14 and the enlarged ends 36 of the fasteners 24. It will be evident that the molding sections or steps M are merely illustrative of standard molding designs or configurations and which can be utilized to cover the base of each post and specifically the anchor brackets 12.

In the preferred form of anchor bracket construction, each bracket 12 is preferably formed by stamping out of metal, each of the flange portions 14, 16 and 18 being of rectangular configuration and the angular flange 14 bent to extend at an obtuse angle relative to the lower edge of the attaching portion or vertical flange portion 16 and at an acute angle to the floor F. Similarly, the lip 18 is formed by bending upwardly at the lower edge of the angular flange 14 so as to be disposed in spaced parallel relation to the vertical flange 16. In assembly, the upper attaching portion 16 is fastened to a sidewall with the lower edge 26 aligned with the end surface of the post P. Thus, when each of the four anchor brackets is assembled on the post, the lower edges 26 will rest on the floor surface, and the fasteners 24 are then threaded downwardly and inwardly through the inclined or angular flanges 14 until the lower end surface of the post is drawn firmly against the floor surface while leaving a slight gap or space as indicated at 40 between the angular flange and floor surface. The angle of entry of the fasteners 24 is dictated by the angle established between the flange 14 and the floor surface and essentially should be at an angle of entry normal to the inclination of the flange 14. After the anchor brackets have been installed as described, the molding strips are placed over each anchor bracket with the lip 18 of each anchor bracket inserted into one of the grooves 28 on the molding section. Although not shown, the molding M may be suitably secured by a bonding agent, nails or a combination of same in covering the anchor brackets.

The angle of inclination of the flange portions 14 away from the vertical flange 16 is preferably at an extremely low angle on the order of 10° to 20° to the floor but sufficient that when fastened into the floor surface will tend to draw the post downwardly and firmly against the floor surface. This angle may be suitably varied and particularly in accordance with the extent or degree of give in the floor surface itself so as to assure that the post is anchored firmly in place. In this connection, a particular advantage of the anchor bracket assembly as described is avoiding necessity of pigtailing fasteners directly through the base end of the post and which tend, over a period of time, to work themselves through the limited thickness of the post, particularly in posts of wooden construction. Thus, the anchor bracket affords an efficient means of pigtailing into the floor surface but at a location spaced outwardly of each wall of the post and thereby form a vastly improved anchor. It will be evident that the particular type of fastener may be varied depending upon the composition or make-up of the posts P and floor surface F. Furthermore, although the anchor brackets have been illustrated as having a width substantially corresponding to the width of the walls W of the post, the brackets may be of substantially reduced width with respect to that of the post.

It is therefore to be understood that while a preferred form of invention has been herein set forth and described, the above and other modifications and changes may be made in the construction and arrangement of elements as well as their intended application and use without departing from the spirit and scope of the present invention as defined by the appended claims and reasonable equivalents thereof.

We claim:

1. An anchor bracket assembly for securing a newel in upstanding relation to a floor surface with one end of said newel in direct engagement with said floor surface, said bracket assembly comprising:

a plurality of bracket members each including an angularly extending flange portion inclining downwardly and away from said newel at an acute angle to said floor surface, an upper attaching portion, and a lower edge of said flange portion resting on said floor surface; and first securing means for securing said upper attaching portion to said newel, and second securing means for securing said angular flange portion to said floor surface whereby to dispose said one end of said newel against said floor surface, said second securing means defined by elongated fasteners extending through openings in said flange portions and into said floor surface at an obtuse angle to said newel.

2. An anchor bracket assembly according to claim 1, said lower edge of each bracket including an upwardly projecting lip, and a cover piece including a groove into which said lip is inserted.

3. An anchor bracket assembly according to claim 2, said cover piece being in the form of decorative molding.

4. An anchor bracket assembly according to claim 1, said upper attaching portion being defined by a vertically extending flange, and said first securing means being defined by elongated fasteners joining said vertical flange to said newel.

5. An anchor bracket assembly according to claim 1, said angular flange extending away from said newel at an acute angle to said floor surface on the order of 10° to 20°, and said second securing means being defined by wood screws.

6. In a newel support assembly for supporting one end of a newel in direct engagement with a floor surface, said assembly comprising:

at least one anchor bracket, said anchor bracket including a first vertical flange in flush relation to a vertical wall surface of said newel, an inclined flange extending downwardly at an obtuse angle to said vertical flange and at an acute angle to said floor surface and having a lower edge contacting said floor surface, said lower edge of said inclined flange terminating in an upwardly directed lip to extend at substantially right angles to said floor surface, and a molding section disposed over said bracket with said lip projecting into a groove in said molding section; and first fastening means for fastening said first vertical flange to said wall of said newel, and second fastening means for fastening said inclined flange to said floor surface with said one end of said newel bearing against said floor surface.

7. In a newel support assembly according to claim 6, said first securing means defined by threaded fastener members extending through openings in said vertical flange into said newel.

8. In a newel support assembly according to claim 6, said second securing means defined by elongated threaded fasteners extending through openings in said inclined flange into said floor surface, said fasteners extending at an acute angle to said newel to project into said floor surface beneath said newel.

* * * * *